United States Patent
Itoh et al.

(10) Patent No.: US 12,554,355 B2
(45) Date of Patent: Feb. 17, 2026

(54) TOUCH SENSOR DEVICE AND TOUCH PANEL DEVICE CAPABLE OF ADJUSTING DETECTION THRESHOLD FOR IDENTIFYING A TYPE OF TOUCH

(71) Applicant: SHARP KABUSHIKI KAISHA, Sakai (JP)

(72) Inventors: Mikio Itoh, Sakai (JP); Kohichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/963,938

(22) Filed: Nov. 29, 2024

(65) Prior Publication Data

US 2025/0190067 A1    Jun. 12, 2025

(30) Foreign Application Priority Data

Dec. 7, 2023  (JP) .................................. 2023-206866

(51) Int. Cl.
*G06F 3/041* (2006.01)
*G06F 3/042* (2006.01)
*G06F 3/044* (2006.01)

(52) U.S. Cl.
CPC .......... *G06F 3/0416* (2013.01); *G06F 3/0425* (2013.01); *G06F 3/044* (2013.01); *G06F 2203/04106* (2013.01)

(58) Field of Classification Search
CPC ...... G06F 3/0416; G06F 3/0425; G06F 3/044; G06F 2203/04106
See application file for complete search history.

(56) References Cited

U.S. PATENT DOCUMENTS

| | | | |
|---|---|---|---|
| 9,916,043 B2 * | 3/2018 | Kamamori | G06F 3/04883 |
| 10,917,431 B2 * | 2/2021 | Turgeman | G06F 21/31 |
| 2010/0225604 A1 * | 9/2010 | Homma | G06F 3/044 345/173 |
| 2011/0102570 A1 * | 5/2011 | Wilf | G06F 3/017 345/156 |
| 2012/0293453 A1 | 11/2012 | Yamada et al. | |
| 2015/0193037 A1 * | 7/2015 | Masaki | G06F 3/041 345/173 |
| 2016/0202768 A1 * | 7/2016 | Yoshida | G06F 3/041 345/156 |
| 2016/0349925 A1 * | 12/2016 | Kamamori | G06F 3/04883 |

FOREIGN PATENT DOCUMENTS

| | | | | |
|---|---|---|---|---|
| EP | 2947553 A1 * | 11/2015 | ......... | G06F 3/04883 |
| JP | 2012-242989 A | 12/2012 | | |

* cited by examiner

*Primary Examiner* — David D Davis
(74) *Attorney, Agent, or Firm* — ScienBiziP, P.C.

(57) ABSTRACT

A touch sensor device includes: a touch sensor; a touch operation detector that detects a touch size by a touch operation of a user for the touch sensor; a touch operation identifier that identifies a type of the touch operation based on the touch size and at least one threshold; and an adjustment controller that adjusts the threshold in accordance with an operation by the user in an adjustment mode.

6 Claims, 10 Drawing Sheets

| TOUCH SIZE S | TYPE OF TOUCH OPERATION X |
|---|---|
| φ2 | P1a |
| φ9 | P1b |
| φ12 | F1 |
| φ40 | H1 |

TOUCH SENSOR DEVICE AND TOUCH PANEL DEVICE CAPABLE OF ADJUSTING DETECTION THRESHOLD FOR IDENTIFYING A TYPE OF TOUCH

CROSS-REFERENCE TO RELATED APPLICATION

The present application claims priority from Japanese Application JP2023-206866, the content to which is hereby incorporated by reference into this application.

BACKGROUND OF THE INVENTION

1. Field of the Invention

The present disclosure relates to a touch sensor device and a touch panel device.

2. Description of the Related Art

It is known that sensitivity correction processing is performed in accordance with a touch position acquired by a touch position detector and it is determined whether an indicator for performing a touch operation is either a pen or a finger on the basis of the corrected sensitivity.

SUMMARY OF THE INVENTION

In conventional touch sensor devices, it is sometimes difficult to accurately identify the type of touch operation because the threshold for identifying the type of touch operation is a fixed value. The term "type of touch operation" as used herein refers to the type of an object touching the touch sensor device at the time of the touch operation. Examples of the "type of touch operation" include, but are not limited thereto, a touch pen, and a user's fingertip or palm.

An object of the present disclosure is to provide a touch sensor device and a touch panel device in which a user can adjust the threshold for identifying the type of touch operation so that it is possible to accurately identify the type of touch operation.

A touch sensor device according to the present disclosure includes a touch sensor, a touch operation detector, a touch operation identifier, and an adjustment controller. The touch operation detector detects a touch size by a touch operation of a user for the touch sensor. The touch operation identifier identifies a type of the touch operation based on the touch size and at least one threshold. The adjustment controller adjusts the threshold in accordance with an operation by the user in an adjustment mode.

A touch panel device according to the present disclosure includes the above-described touch sensor device and a display device including a display. The touch panel device further includes a display controller. The display controller causes the display to sequentially display a plurality of instruction contents for the user in the adjustment mode. The instruction contents give instructions of different types of the touch operations to the user. The adjustment controller updates the threshold associated with the user by using the threshold calculated based on each of the touch sizes detected each time the plurality of instruction contents is sequentially displayed.

A touch panel device according to the present disclosure includes the above-described touch sensor device and a display device including a display. The touch panel device further includes a display controller and an operation acceptor. The display controller causes the display to display an instruction content for the user in the adjustment mode. The operation acceptor accepts an input operation corresponding to the instruction content. The adjustment controller updates the threshold associated with the user by using the threshold determined based on the input operation.

According to the present disclosure, since the user can adjust the threshold for identifying the type of touch operation, it is possible to accurately identify the type of touch operation.

DETAILED DESCRIPTION OF THE INVENTION

Embodiments of the present disclosure will be described with reference to the drawings. In the drawings, the same or corresponding parts are denoted by the same reference numerals, and the description thereof will not be repeated.

First Embodiment 1.1 Overall Configuration of Touch Panel Device 10

Figure 1:
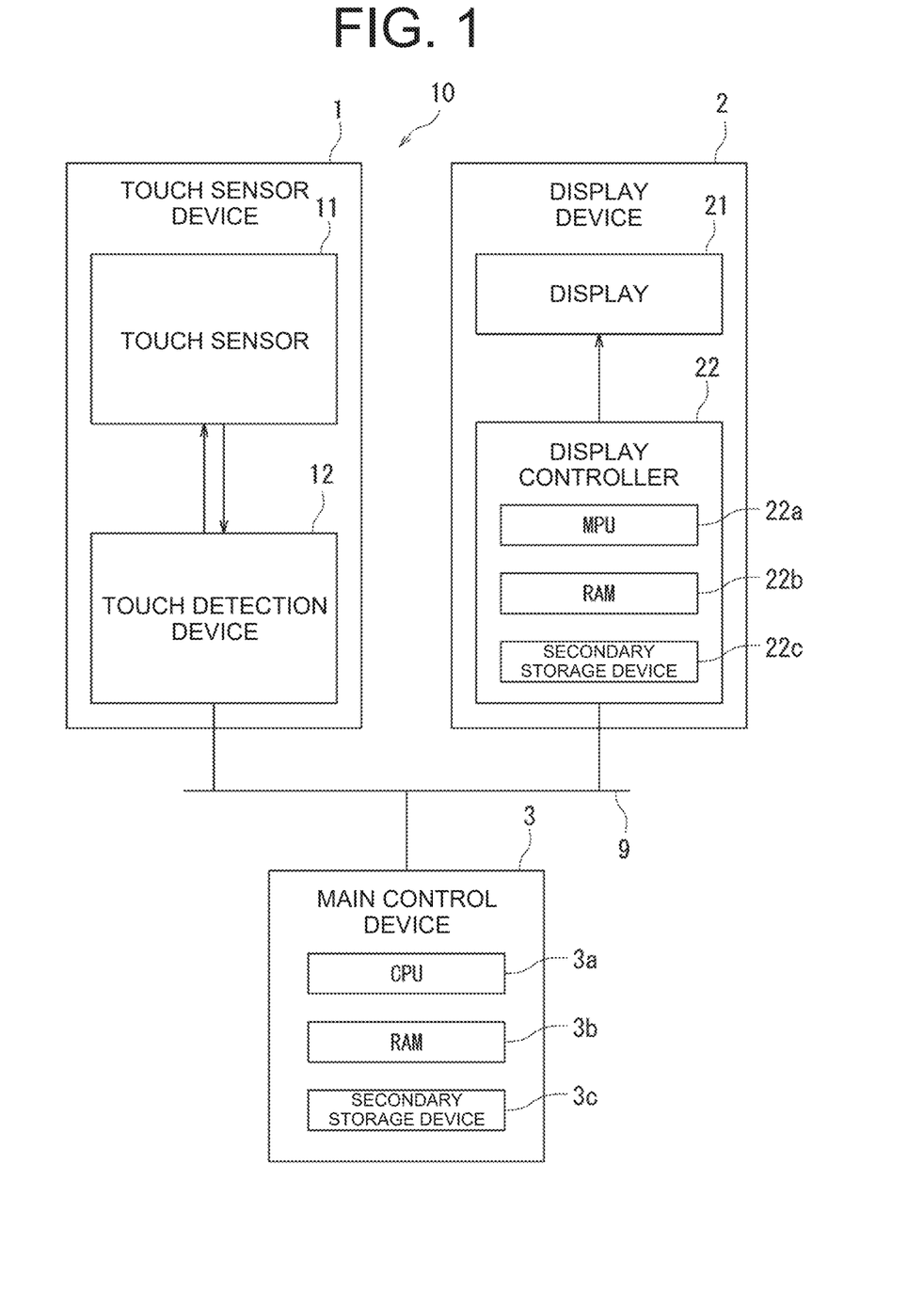
FIG. 1 is a block diagram illustrating an overall configuration of a touch panel device 10 including a touch sensor device 1 according to a first embodiment of the present disclosure.

First, the overall configuration of a touch panel device 10 will be described with reference to FIG. 1. FIG. 1 is a block diagram illustrating an overall configuration of the touch panel device 10 including a touch sensor device 1 according to a first embodiment of the present disclosure.

As illustrated in FIG. 1, the touch panel device 10 includes the touch sensor device 1, a display device 2, and a main control device 3. The touch sensor device 1 includes a touch sensor 11 and a touch detection device 12. The display device 2 includes a display 21 and a display controller 22. The touch detection device 12, the display controller 22, and the main control device 3 can exchange data with each other through a signal transmission medium 9 such as a bus. The touch sensor device 1 is an example of an "operation acceptor" according to the present disclosure.

The main control device 3 includes a central processing unit (CPU) 3*a*, a random access memory (RAM) 3*b*, and a secondary storage device 3*c*.

The CPU 3*a* executes various computer programs previously stored in the secondary storage device 3*c*. Thus, the CPU 3*a* executes various kinds of data processing and control of the touch sensor device 1 and the display device 2.

The RAM 3*b* is a computer-readable volatile storage device. The RAM 3*b* temporarily stores a computer program to be executed by the CPU 3*a* and data to be subjected to data processing.

The secondary storage device 3*c* is a computer-readable non-volatile storage device. For example, a flash memory, an electrically erasable and programmable ROM (hereinafter abbreviated as EEPROM) (registered trademark), a hard disk drive, or the like, is adopted as the secondary storage device 3*c*.

The display 21 is a device capable of displaying images. The display 21 is, for example, a liquid crystal display panel or an organic electro luminescence (EL) panel. The liquid crystal display panel includes a liquid crystal panel and a backlight.

The display controller 22 drives the display 21. The display controller 22 controls the display 21 so that the display 21 displays images, characters, and the like. The display controller 22 includes a micro processing unit (MPU) 22*a*, a RAM 22*b*, and a secondary storage device 22*c*.

The RAM 22*b* and the secondary storage device 22*c* included in the display controller 22 are the same devices as the RAM 3*b* and the secondary storage device 3*c* included in the main control device 3, respectively. The display controller 22 may include another processor such as a digital signal processor (DSP) instead of the MPU 22*a*.

1.2 Configuration of Touch Sensor Device 1

Figure 2:
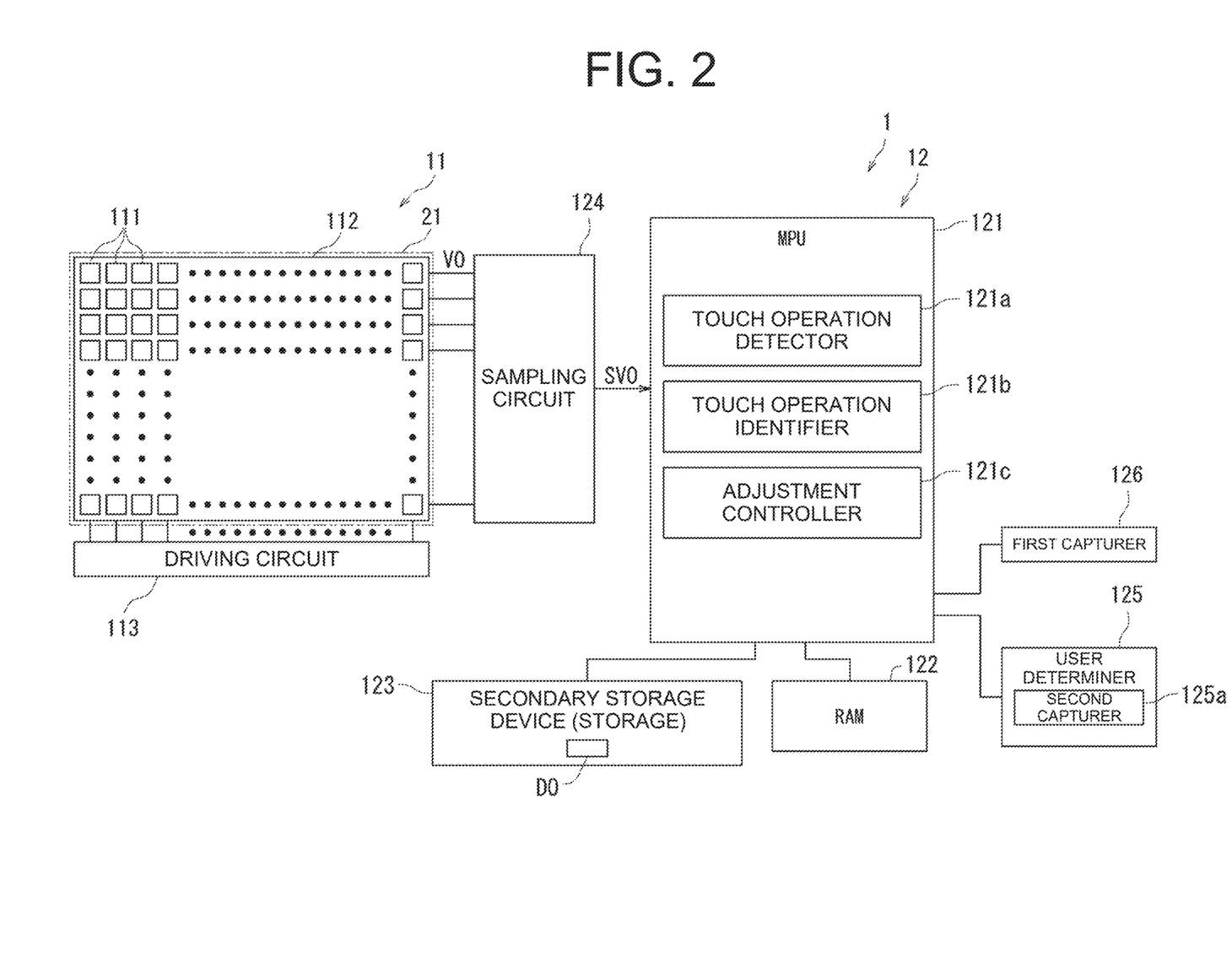
FIG. 2 is a block diagram illustrating a configuration of the touch sensor device 1.
Figure 3:
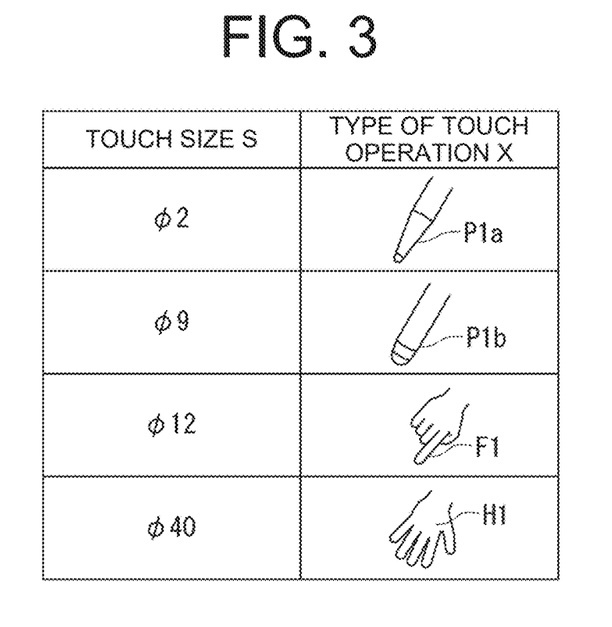
FIG. 3 is a table illustrating the correspondence between a touch size S and a type of a touch operation X.
Figure 4:
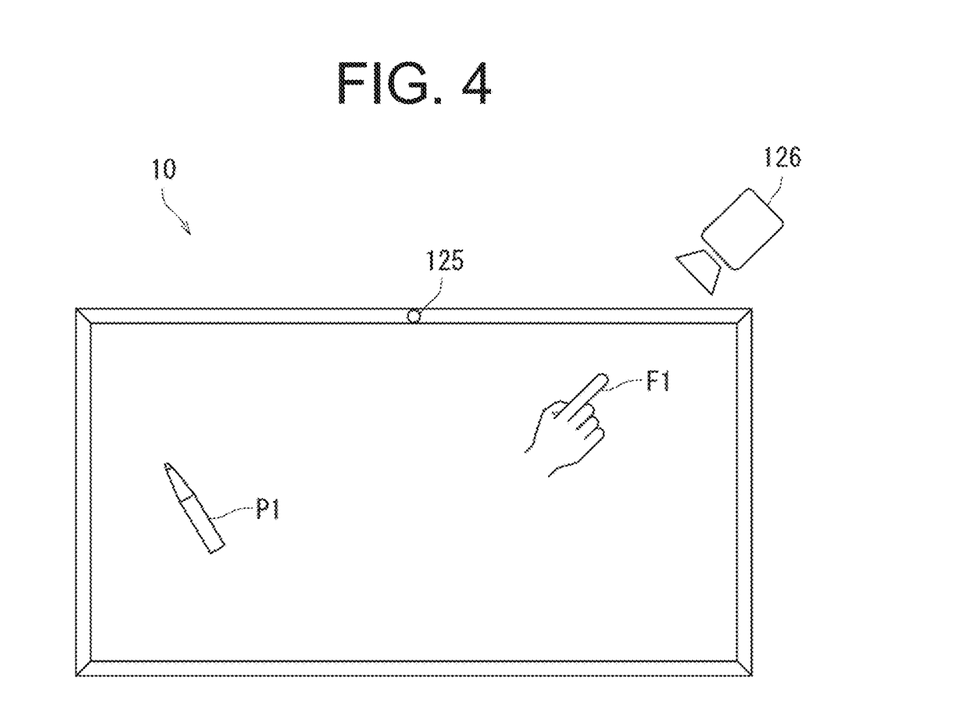
FIG. 4 is an explanatory diagram illustrating an arrangement example of a first capturer 126 and a user determiner 125.
Figure 5:
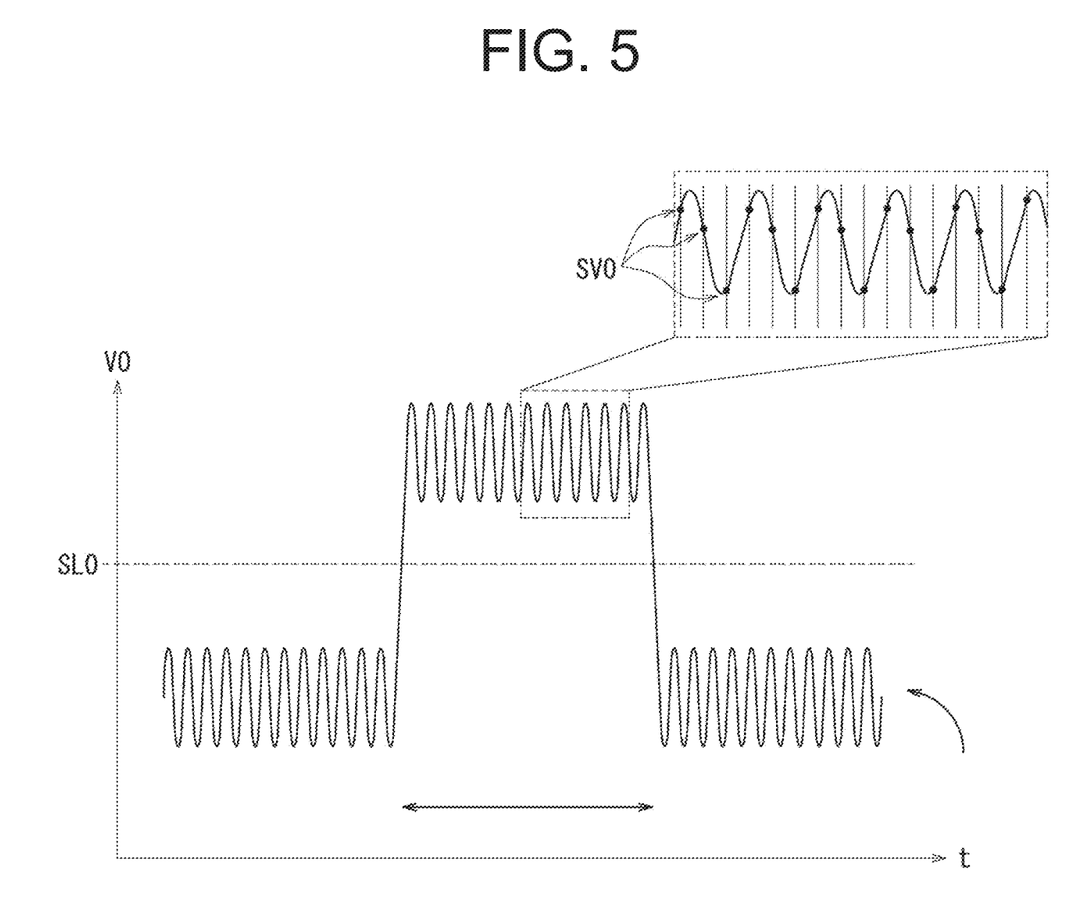
FIG. 5 is an explanatory diagram illustrating a relationship between a change in a detection signal V0 of a touch sensor 11 included in the touch sensor device 1 and a sampling value SV0.

Next, a configuration of the touch sensor device 1 will be described with reference to FIGS. 2 to 5. FIG. 2 is a block diagram illustrating a configuration of the touch sensor device 1. FIG. 3 is a table illustrating the correspondence between a touch size S and the type of a touch operation X. FIG. 4 is an explanatory diagram illustrating an arrangement example of a first capturer 126 and a user determiner 125. FIG. 5 is an explanatory diagram illustrating a relationship between a change in a detection signal V0 of the touch sensor 11 included in the touch sensor device 1 and a sampling value SV0.

The touch sensor 11 of the touch sensor device 1 detects a touch operation at a plurality of coordinate positions of the display 21. The touch sensor 11 detects the degree of contact by a touch pen, a user's fingertip, or the like, at the plurality of coordinate positions.

As illustrated in FIG. 2, the touch sensor 11 includes a plurality of transparent electrodes 111, a transparent protective cover 112, a driving circuit 113, and the like. Specifically, the touch sensor 11 is a capacitive sensor. More specifically, examples of the capacitive sensor include a surface capacitive sensor. However, the touch sensor 11 is not limited to such an example. Different types of touch sensors will be described below in a second embodiment and a third embodiment.

The plurality of electrodes 111 is arranged at the plurality of coordinate positions on the back surface of the protective cover 112. The protective cover 112 is superimposed on the display 21. Therefore, the plurality of electrodes 111 is arranged at the plurality of coordinate positions on the front surface of the display 21.

The driving circuit 113 supplies drive signals to the plurality of electrodes 111. The plurality of electrodes 111, to which the drive signals are supplied, outputs the detection signal V0 indicating the degree of attachment of the touch pen, the user's fingertip, or the like, at each coordinate position on the protective cover 112.

The touch detection device 12 includes an MPU 121, a RAM 122, a secondary storage device 123, a sampling circuit 124, the user determiner 125, and the first capturer 126. The secondary storage device 123 is an example of a "storage" according to the present disclosure.

The MPU 121 executes various computer programs previously stored in the secondary storage device 123. Accordingly, the MPU 121 executes processing for detecting a valid touch operation on the touch sensor 11.

The RAM 122 is a computer-readable volatile storage device. The RAM 122 temporarily stores a computer program to be executed by the MPU 121 and data to be subjected to data processing.

The secondary storage device 123 is a computer-readable non-volatile storage device. For example, the secondary storage device 123 may be a flash memory or an EEPROM.

The sampling circuit 124 samples the detection signal V0 of the touch sensor 11 at a predetermined sampling frequency to sequentially output the plurality of sampling values SV0. FIG. 5 illustrates the relationship between the detection signal V0 and the sampling value SV0.

The sampling circuit 124 is what is called an analog/digital (AD) conversion circuit. That is, the sampling value SV0 is a value of digital data.

The MPU 121 compares the sampling value SV0 of the detection signal V0 with a preset detection threshold SL0 to detect a valid touch operation on the touch sensor 11 (see FIG. 5). To be specific, when the sampling value SV0 is equal to or more than the detection threshold SL0, the MPU 121 determines that the user's touch operation is a valid touch operation. In the following description, a valid touch operation is referred to as a "valid operation", and an invalid touch operation is referred to as an "invalid operation".

Further, the detection threshold SL0 is a threshold for detecting a touch operation at each of the coordinate positions and determining whether the touch operation is a valid operation or an invalid operation. That is, the detection threshold SL0 has a different technical meaning from the "threshold" for identifying the type of touch operation according to the present disclosure.

Further, the MPU 121 outputs the data of the coordinate position at which the valid operation is detected to the display controller 22 and the main control device 3.

The display controller 22 can execute a touch drawing process. The touch drawing process is a process of causing the display 21 to display the trajectory image representing the trajectory of the coordinate positions at which the valid operation is detected on the display 21. The touch panel device 10 including the display controller 22 described above may be referred to as an electronic whiteboard.

The MPU 121 executes a computer program previously stored in the secondary storage device 123 to operate as a touch operation detector 121*a*, a touch operation identifier 121*b*, and an adjustment controller 121*c*.

The touch operation detector 121a detects the touch size S by the touch operation X of the user on the touch sensor 11. The touch size S means the overall size of one or more coordinate positions at which the valid operation is detected and is a concept including, for example, an area and a line width. As the touch size S, for example, the line width of a tip P1a of a touch pen P1 is assumed to be 2 mm, the line width of a head P1b of the touch pen P1 is assumed to be 9 mm, a fingertip F1 is assumed to be 12 mm, and a palm H1 is assumed to be 40 mm, but the touch size S is not limited to such sizes.

The touch operation identifier 121b identifies the type of the touch operation X based on the touch size S and at least one threshold T. Further, in order to identify the type of the touch operation X by the touch size S, it is necessary to use at least the number of thresholds T that is smaller than the number of types of the touch operations X by one. For example, when there are four types of the touch operations X, at least three thresholds are necessary to identify the touch operations X.

The adjustment controller 121c adjusts the threshold T in accordance with an operation by the user in the adjustment mode. A method for adjusting the threshold T will be described below.

Therefore, the user can adjust the threshold T for identifying the type of the touch operation X. As a result, it is possible to accurately identify the type of the touch operation X.

Examples of the type of the touch operation X identified by the touch operation identifier 121b include, but are not limited thereto, the touch pen P1, the fingertip F1, and the palm H1 as illustrated in FIG. 3. Therefore, it is only necessary to selectively use the touch pen P1, the fingertip F1, and the palm H1 without performing an operation of switching a function to be used in the touch panel device 10 each time. As a result, the operability of the touch panel device 10 is improved. For example, the touch pen P1 may be assigned to drawing of a line on the display 21, the fingertip F1 may be assigned to selection of an object, and the palm H1 may be assigned to an eraser, but the assignment to such functions is not limited.

Some of the touch pens P1 are configured to be able to use both the tip P1a (for a thin line) and the head P1b (for a thick line). In this case, the tip P1a and the head P1b are preferably identified as different types of touch operations.

The first capturer 126 captures the touch operation X. The touch operation identifier 121b identifies the type of the touch operation X based on the touch size S, the threshold T, and a video or an image captured by the first capturer 126. Therefore, the type of the touch operation X is identified based on not only the touch size S and the threshold T but also the captured video or image of the touch operation X. As a result, the identification accuracy of the type of touch operation is improved.

The first capturer 126 is provided so as to be able to capture the vicinity of the front surface of the display 21 in order to capture the touch operation X. For example, as illustrated in FIG. 4, the first capturer 126 is provided toward the center portion of the display 21 on one end side of the upper portion of the display 21. Accordingly, the first capturer 126 can capture the touch pen P1 or the fingertip F1 that performs the touch operation. The arrangement and the number of the first capturers 126 are not limited to such an example. Examples of the first capturer 126 include one visible light camera having an angle of view capable of capturing the entire display 21. Alternatively, a plurality of visible light cameras having a narrower angle of view may be combined and disposed so as to be able to capture the entire display 21. However, the present disclosure is not limited to such an arrangement example.

The user determiner 125 determines a user. The storage 123 stores the threshold T in association with the user. Accordingly, the user is automatically determined by the user determiner 125, and the threshold T is stored in the storage 123 as profile information in association with the determined user.

Further, the touch operation identifier 121b identifies the type of the touch operation X based on the touch size S and the threshold T in association with the user stored in the storage 123. The adjustment controller 121c updates the threshold T in association with the user stored in the storage 123.

Therefore, the threshold T for identifying the type of the touch operation X can be stored for each user and is updated by the operation of the user. As a result, erroneous detection caused by a difference in the thickness of the tip P1a or the head P1b of the touch pen P1 to be used, an individual difference in the thickness of the fingertip F1 or the size of the palm H1 of the user, or the like, is suppressed, and the identification accuracy of the type of the touch operation is further improved.

The user determiner 125 may include a second capturer 125a that captures the user. Therefore, it is possible to determine the user by analyzing the video captured by the second capturer 125a. As a result, since the threshold T previously adjusted by the user can be used, the identification accuracy of the type of the touch operation is further improved.

Examples of the second capturer 125a include, but are not limited thereto, a visible light camera. By analyzing the face image of the user captured by the visible light camera, the user can be determined. The second capturer 125a is preferably provided at such a position and orientation that the user who performs the touch operation X can be captured without fail. For example, when the touch panel device 10 is an electronic whiteboard, the second capturer 125a may be provided so as to look down the user facing the touch panel device 10 from the vicinity of the center of the upper portion of the electronic whiteboard. When the touch panel device 10 is a smartphone or a tablet, an in-camera that captures images in a front direction may be used as the second capturer 125a.

However, the user determiner 125 is not limited to the second capturer 125a. Further, for example, user authentication may be performed before the start of use of the touch panel device 10. Examples of the authentication method include, but are not limited thereto, biometric authentication and authentication using a password. Thus, the user can be surely determined.

Figure 6:
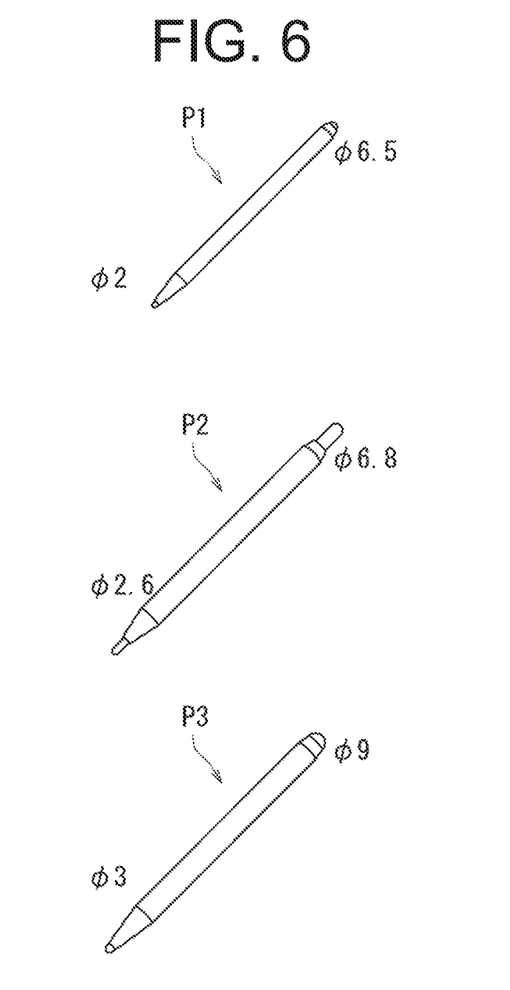
FIG. 6 is an explanatory diagram illustrating a difference in thickness between a tip P1$a$ and a head P1$b$ of a touch pen P1.
Figure 7:
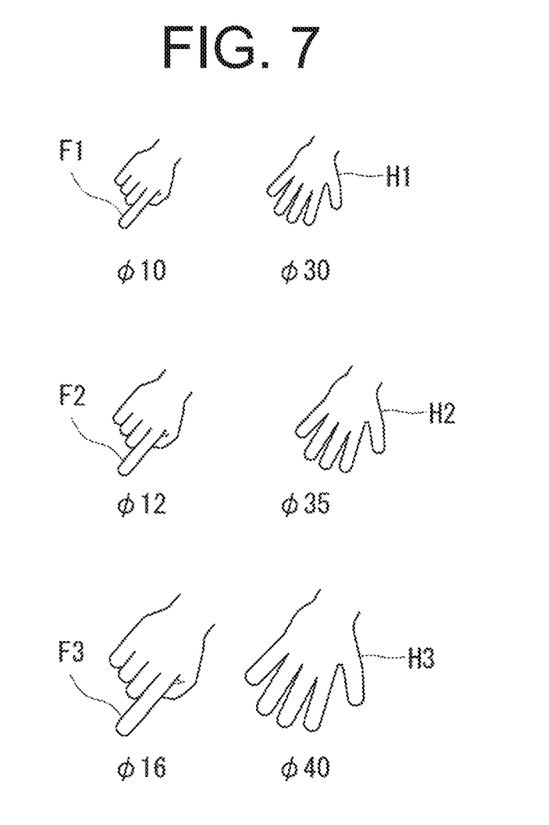
FIG. 7 is an explanatory diagram illustrating individual differences in the thickness of a fingertip F1 and the size of a palm H1 of a user.

1.3 Differences in Thickness of Touch Pen P1 and Individual Differences in Fingertip F1 and Palm H1 of User Next, with reference to FIGS. 6 and 7, differences in the thickness of the tip P1a and the head P1b of the touch pen P1 and individual differences in the thickness of the fingertip F1 and the size of the palm H1 of the user will be described. FIG. 6 is an explanatory diagram illustrating differences in thickness of the tip P1a and the head P1b of the touch pen P1. FIG. 7 is an explanatory diagram illustrating individual differences in the thickness of the fingertip F1 and the size of the palm H1 of the user.

As illustrated in FIG. 6, there are various types of touch pens, and the thicknesses of the tip and the head are also different. For example, in the touch pen P1 illustrated in the upper part of FIG. 6, the thickness of the tip is 2 mm, and the thickness of the head is 6.5 mm. In a touch pen P2 illustrated in the middle part of FIG. 6, the thickness of the tip is 2.6 mm, and the thickness of the head is 6.8 mm. In a touch pen P3 illustrated in the lower part of FIG. 6, the thickness of the tip is 3 mm, and the thickness of the head is 9 mm.

For the touch pens P1 to P3, the threshold T for identifying the tip and the head by the touch size may be, for example, the mean value of the thicknesses of the tips and the heads. In this case, the threshold Tis 4.25 mm for the touch pen P1, the threshold Tis 4.7 mm for the touch pen P2, and the threshold Tis 6 mm for the touch pen P3. Among these, the threshold T of the touch pen P1 may be registered as an initial value. However, these thresholds T are merely examples.

As illustrated in FIG. 7, there are individual differences in the thickness of the fingertip and the size of the palm of the user. For example, the thickness of the fingertip F1 illustrated in the upper part of FIG. 7 is 10 mm, and the size of the palm H1 is 30 mm. The thickness of a fingertip F2 illustrated in the middle part of FIG. 7 is 12 mm, and the size of a palm H2 is 35 mm. The thickness of a fingertip F3 illustrated in the lower part of FIG. 7 is 16 mm, and the size of a palm H3 is 40 mm.

The threshold T for identifying the fingertips F1 to F3 and the palms H1 to H3 by the touch size may be, for example, the mean value of the thicknesses of the fingertips and the sizes of the palms. In this case, the threshold T for the combination of the fingertip F1 and the palm H1 is 20 mm, the threshold T for the combination of the fingertip F2 and the palm H2 is 23.5 mm, and the threshold T for the combination of the fingertip F3 and the palm H3 is 28 mm. However, these thresholds T are merely examples.

1.4 Basic Operation of Touch Panel Device 10

Figure 8:
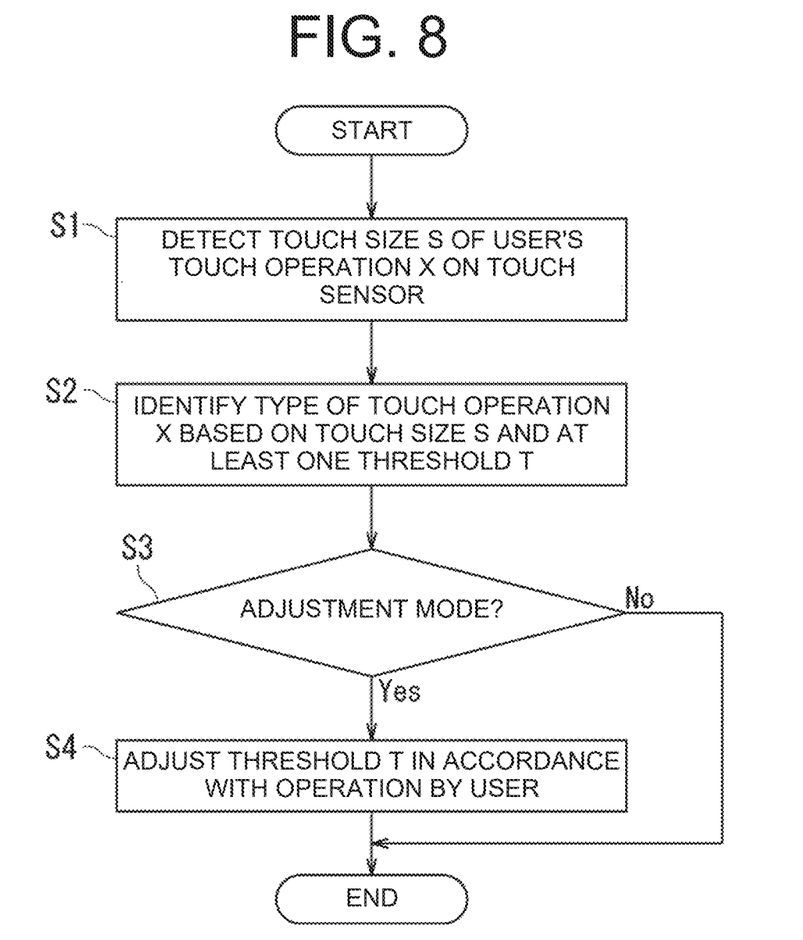
FIG. 8 is a flowchart illustrating a basic operation of the touch panel device 10.

Next, a basic operation of the touch panel device 10 will be described with reference to FIG. 8. FIG. 8 is a flowchart illustrating a basic operation of the touch panel device 10.

As illustrated in FIG. 8, in step S1, the touch operation detector 121a detects the touch size S of the user's touch operation X on the touch sensor.

In step S2, the touch operation identifier 121b identifies the type of the touch operation X based on the touch size S and at least the one threshold T. As described above, the user determiner 125 determines the user, and the storage 123 stores the threshold T in association with the user. Thus, the threshold T stored in the storage 123 in association with the user determined by the user determiner 125 can be used to identify the type of the touch operation X.

In step S3, the MPU 121 determines whether the touch panel device 10 is in the adjustment mode, and when the touch panel device 10 is in the adjustment mode, the process proceeds to step S4, and when the touch panel device 10 is not in the adjustment mode, the series of processes is terminated.

In step S4, the adjustment controller 121c adjusts the threshold T in accordance with an operation by the user, and then ends the series of processes. Here, the operation by the user is a procedure for adjusting the threshold T, and is executed only in the adjustment mode.

1.5 Automatic Adjustment (Calibration) of Threshold T

Figure 9:
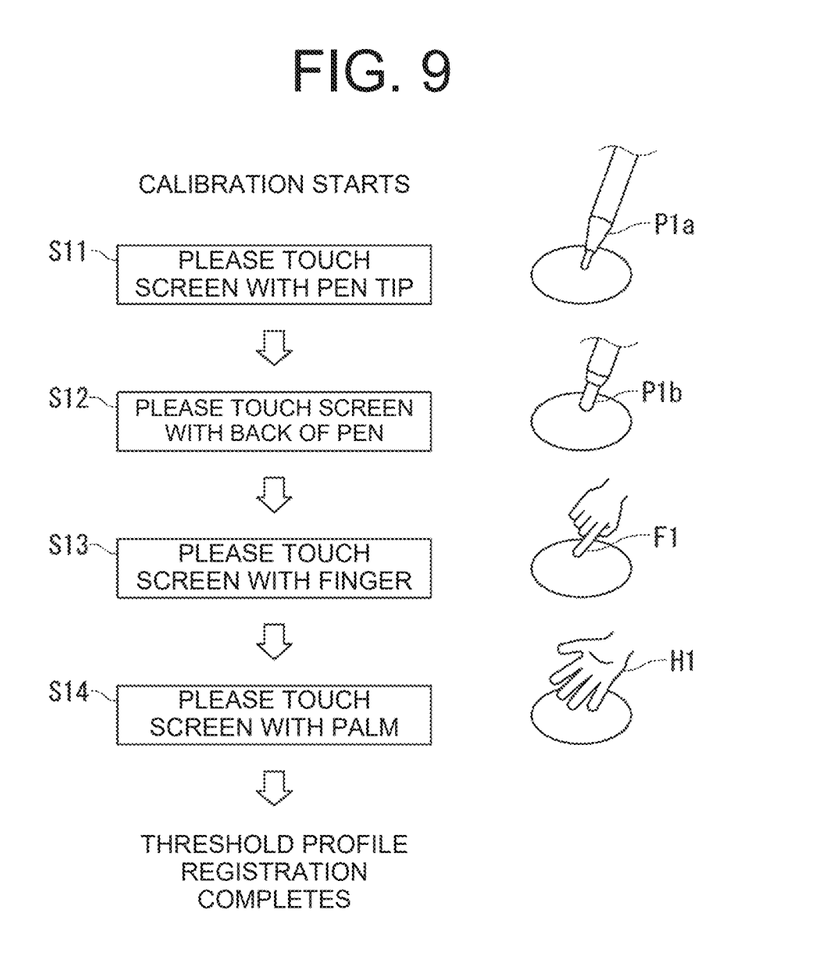
FIG. 9 is an explanatory diagram illustrating a procedure for adjusting a threshold T.

Next, with reference to FIG. 9, a procedure will be described in which the threshold T for the user is automatically adjusted only by the user sequentially performing the different touch operations X in accordance with an instruction from the touch panel device 10. FIG. 9 is an explanatory diagram illustrating a procedure for adjusting the threshold T.

The display controller 22 causes the display 21 to sequentially display a plurality of instruction contents for the user in the adjustment mode. The instruction contents give instructions of different types of the touch operations X to the user. The adjustment controller 121c updates the threshold T in association with the user by using the threshold T calculated based on each of the touch sizes S detected each time a plurality of instruction contents is sequentially displayed.

Therefore, the threshold T of the user is automatically updated based on the touch size S detected when the user actually performs the various touch operations X. As a result, the identification accuracy of the types of the various touch operations X is greatly improved by a simple adjustment operation.

For example, as illustrated in FIG. 9, when the calibration of the threshold T is started in the adjustment mode, for example, "Please touch the screen with the pen tip" is displayed on the display 21 in step S11. Accordingly, the user touches the touch sensor 11 with the tip P1a of the touch pen P1. Then, the touch size S detected by the touch operation detector 121a is stored as Sp1a in the RAM 122.

In step S12, the display 21 displays, for example, "Please touch the screen with the back of the pen". Accordingly, the user touches the touch sensor 11 with the head P1b of the touch pen P1. Then, the touch size S detected by the touch operation detector 121a is stored as Sp1b in the RAM 122.

In step S13, the display 21 displays, for example, "Please touch the screen with a finger". Accordingly, the user touches the touch sensor 11 with the fingertip F1. Then, the touch size S detected by the touch operation detector 121a is stored as Sf1 in the RAM 122.

In step S14, the display 21 displays, for example, "Please touch the screen with a palm". Accordingly, the user touches the touch sensor 11 with the palm H1. Then, the touch size S detected by the touch operation detector 121a is stored as Sh1 in the RAM 122.

The adjustment controller 121c obtains the threshold T1 for identifying the tip P1a and the head P1b of the touch pen P1, the threshold T2 for identifying the head P1b of the touch pen P1 and the fingertip F1, and the threshold T3 for identifying the fingertip F1 and the palm H1 in accordance with, for example, the following equations. However, the present disclosure is not limited to such methods or equations.

$$T1 = (Sp1a + Sp1b)/2$$

$$T2 = (Sp1b + Sf1)/2$$

$$T3 = (Sf1 + Sh1)/2$$

The adjustment controller 121c further stores the thresholds T1, T2, and T3 in the storage 123 in association with the user. When the thresholds T1, T2, and T3 have already been stored in association with the user, the stored contents are updated.

1.6 Manual Adjustment of Threshold T

In the automatic adjustment procedure of the threshold T described above, the threshold T appropriate for the user is automatically calculated and the storage content of the storage 123 is also updated only by the user sequentially performing the different touch operations X in accordance with the instruction displayed on the display 21. However, an adjustment procedure in which the user can directly change the threshold T itself may be separately provided.

In this case, the display controller 22 causes the display 21 to display the instruction content to the user in the adjustment mode. The touch sensor device 1, which is an example of an operation acceptor, accepts an input operation corresponding to an instruction content. The adjustment controller 121c updates the threshold T in association with the user by using the threshold T determined based on the input operation.

Therefore, the threshold T for the user can be updated flexibly and manually. As a result, the threshold T is finely adjusted by the manual adjustment work, and the identification accuracy of the type of the various touch operations X can be greatly improved.

1.7 Method for Implementation on Touch Panel Device 10

As a method for implementing the present disclosure in the touch panel device 10, specifically, a method for storing the threshold T as profile information, for example, a threshold adjustment command may be provided in a touch control board (firmware). Alternatively, a framework for threshold adjustment and protocol change may be provided in a driver on the information terminal side. However, the implementation method is not limited to such an example.

Second Embodiment

In the touch sensor 11 according to the above-described first embodiment, it is determined whether the operation is a valid operation by the electrodes 111 at each of the plurality of coordinate positions arranged in a grid pattern. Then, the size of one or more coordinate positions where the valid operation is detected as a whole is detected as the touch size S. Conversely, according to a second embodiment, the touch sensor 11 is replaced with a touch sensor 11A.

Figure 10:
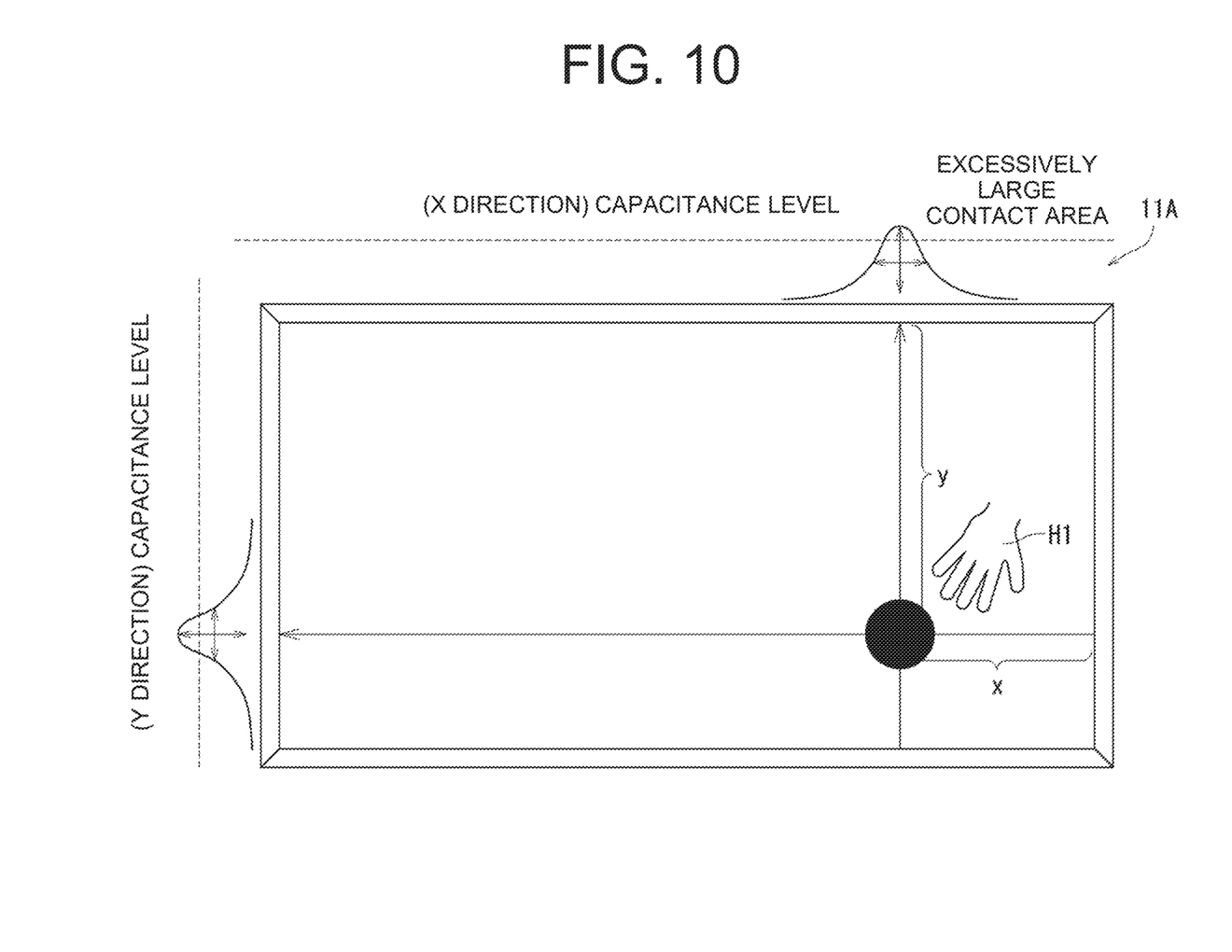
FIG. 10 is an explanatory diagram of detection of the touch size S by a touch sensor 11A according to a second embodiment of the present disclosure.

FIG. 10 is an explanatory diagram of detection of the touch size S by the touch sensor 11A according to the second embodiment of the present disclosure. The capacitance levels in the X direction and the Y direction are detected by the touch sensor 11A so that the touch size S can be detected. The configuration other than the touch sensor 11A is substantially the same as that of the first embodiment.

As illustrated in FIG. 10, the touch sensor 11A can continuously detect the capacitance level in the X direction and the capacitance level in the Y direction. For example, in the case of a detection circuit configuration that has a high capacitance level of a portion with which an object such as the touch pen P1 or the fingertip F1 is in contact, the width of a portion that has a capacitance level higher than the preset threshold of the capacitance level is obtained in the X direction and the Y direction. Assuming that the obtained widths in the X and Y directions are Wx2 and Wy2, respectively, the touch size S can be calculated based on Wx2 and Wy2 on the assumption that the portion touched (in contact with an object such as the touch pen P1) has an elliptical shape.

FIG. 10 illustrates a case where the contact area becomes excessively large by the touch operation X with the palm H1. In the case of the touch operation X by the fingertip F1, the head P1b, and the tip P1a of the touch pen P1, the contact area becomes smaller in this order.

Third Embodiment

In the touch sensor 11A according to the second embodiment described above, the capacitance levels in the X direction and the Y direction are detected so that the touch size S can be detected. Conversely, according to a third embodiment, the touch sensor 11A is replaced with a touch sensor 11B.

Figure 11:
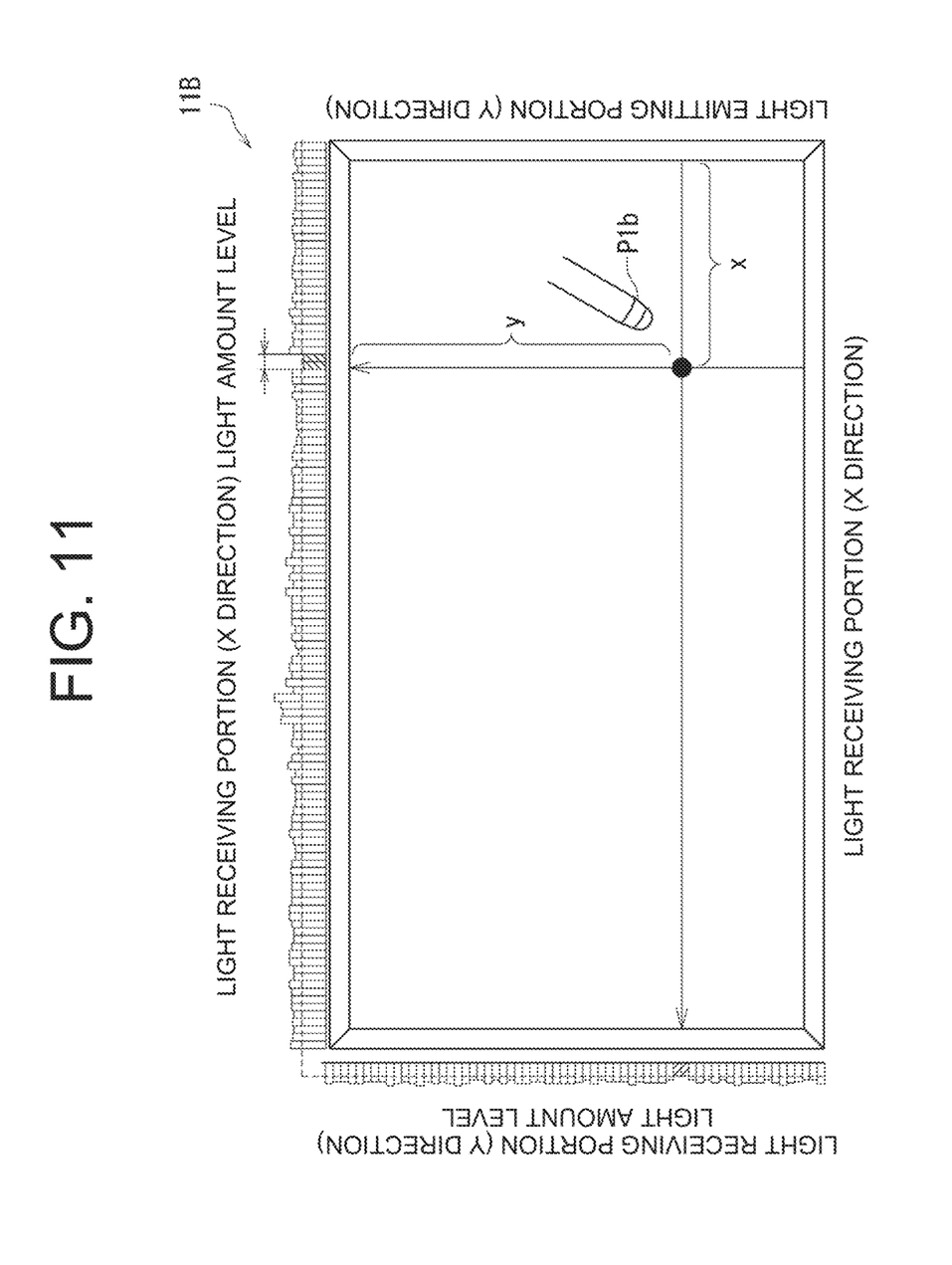
FIG. 11 is an explanatory diagram of detection of the touch size S by a touch sensor 11B according to a third embodiment of the present disclosure.

FIG. 11 is an explanatory diagram of detection of the touch size S by the touch sensor 11B according to the third embodiment of the present disclosure. In the touch sensor 11B, an infrared light emitting element array is provided on one long side (the X direction), and a light receiving element array is provided on the other long side so as to be opposed to the infrared light emitting element array. Similarly, an infrared light emitting element array is provided on one short side (the Y direction), and a light receiving element array is provided on the other short side so as to be opposed to the infrared light emitting element array. In the touch sensor 11B, the light reception levels of the light receiving element arrays in the X direction and the Y direction are detected so that the touch size S can be detected.

As illustrated in FIG. 11, the touch sensor 11B can discretely detect the light reception level of each of the light receiving elements of the light receiving element array in the X direction and the light reception level of each of the light receiving elements of the light receiving element array in the Y direction. When the light from the light emitting element is blocked by the touch pen P1, the fingertip F1, or the like, the amount of light that reaches the corresponding light receiving element is lower than normal. Therefore, it is preferable to use a light emitting element array and a light receiving element array with an arrangement interval finer than the arrangement interval corresponding to the minimum necessary detection accuracy of the touch size S.

Assuming that the width in the X direction of a portion where the light reception level is lower than a preset threshold is Wx3 and the width in the Y direction of the portion is Wy3, the touch size S can be calculated based on Wx3 and Wy3 on the assumption that the portion touched (in contact with an object such as the touch pen P1) has an elliptical shape.

FIG. 11 illustrates the contact area corresponding to the touch operation X with the head P1b of the touch pen P1. In the case of the touch operation X with the tip P1a of the touch pen P1, the contact area further decreases. Conversely, in the case of the touch operation X with the fingertip F1 and the palm H1, the contact area increases in this order.

The present disclosure can be implemented in various other forms without departing from the gist or main features of the present disclosure. Therefore, the above-described embodiments are merely examples in all respects and should not be interpreted in a limited manner. The scope of the present disclosure is defined by the appended claims and is not limited by the description of the specification. Furthermore, all modifications and changes belonging to the equivalent scope of the claims are included in the scope of the present disclosure.

The present disclosure can be used for a touch sensor device and a touch panel device.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A touch panel device comprising:
   a touch sensor device comprising:
      a touch sensor;

a touch operation detector that detects a touch size during a touch operation of a user on the touch sensor;

a touch operation identifier that identifies a type of the touch operation based on the touch size and at least one threshold; and an adjustment controller that adjusts the at least one threshold based on an operation by the user in an adjustment mode;

a display device including a display; and a display controller that causes the display to sequentially display a plurality of instruction contents to the user in the adjustment mode, wherein the plurality of instruction contents provides instructions associated with different types of the touch operation to the user, and the adjustment controller updates each one of the at least one threshold by calculating the threshold based on each touch size detected each time a sequential instruction content in the plurality of instruction contents is displayed.

2. The touch panel device according to claim 1, wherein the type of the touch operation identified by the touch operation identifier includes one of a pen, a fingertip, and a palm capable of performing the touch operation.

3. The touch panel device according to claim 1, further comprising an image capturer that captures an image or a video during the touch operation, wherein the touch operation identifier identifies the type of the touch operation based on the touch size, the at least one threshold, and further based on the video or the image captured by the image capturer.

4. The touch panel device according to claim 1, further comprising:

a user determiner that determines the user; and a storage that stores the at least one threshold in association with the user, wherein the touch operation identifier identifies the type of the touch operation based on the touch size and the at least one threshold stored in the storage in association with the user, and the adjustment controller updates the at least one threshold stored in the storage in association with the user.

5. The touch panel device according to claim 4, wherein the user determiner includes an image capturer that captures an image or a video of the user.

6. The touch panel device according to claim 1, further comprising:

an operation acceptor that accepts an input operation corresponding to each instruction content in the plurality of instruction contents, wherein the adjustment controller updates each of the at least one threshold by using the threshold determined based on the input operation.

* * * * *